(12) United States Patent
St. Clair

(10) Patent No.: US 7,897,869 B2
(45) Date of Patent: Mar. 1, 2011

(54) RETRACTABLE ELECTRICAL CORD BOX

(76) Inventor: Timothy L. St. Clair, Kahoka, MO (US)

( * ) Notice: Subject to any disclaimer, the term of this patent is extended or adjusted under 35 U.S.C. 154(b) by 276 days.

(21) Appl. No.: 12/283,154

(22) Filed: Sep. 10, 2008

(65) Prior Publication Data
US 2010/0059268 A1 Mar. 11, 2010

(51) Int. Cl.
H01H 9/02 (2006.01)
(52) U.S. Cl. .............. 174/53; 174/57; 174/481; 174/66; 174/58; 439/142
(58) Field of Classification Search .............. 174/53, 174/57, 481, 66, 67, 58; 439/107, 142, 148, 439/501; 220/3.3, 3.7
See application file for complete search history.

(56) References Cited

U.S. PATENT DOCUMENTS

| 5,045,640 | A | * | 9/1991 | Riceman | 174/67 |
| 5,280,135 | A | * | 1/1994 | Berlin et al. | 174/67 |
| 5,773,757 | A | * | 6/1998 | Kenney et al. | 174/53 |
| D522,967 | S | | 6/2006 | St. Clair | |

* cited by examiner

Primary Examiner — Dhiru R Patel
(74) Attorney, Agent, or Firm — James Ray & Assoc

(57) ABSTRACT

An apparatus for assembling over a standard electrical wall outlet for providing a handy and neatly stored retractable extension cord disposed in such apparatus. Such apparatus further includes a regular outlet disposed on a cover portion of the apparatus. Such apparatus mounts closely adjacent such standard wall outlet. The retractable extension cord assembly has a twist lock receptacle that can be used with compatible electrical devices.

16 Claims, 4 Drawing Sheets

US 7,897,869 B2

RETRACTABLE ELECTRICAL CORD BOX

FIELD OF THE INVENTION

The present invention relates, in general, to a wall mounted receptacle, and, more particularly, the present invention relates to a wall mounted receptacle apparatus designed to be assembled over a standard wall outlet to provide a handy and neatly stored extension cord therein and a fixed outlet disposed on an outer portion of such apparatus.

BACKGROUND OF THE INVENTION

Many electrically powered products are offered with extra-long power cords. Unfortunately, these cords become twisted and tangled. This can lead to accidents or situations in which the cords can become confused and even accidentally unplugged. In addition, work areas and counter tops can easily become cluttered by these cords. Sometimes, the electrical cord on a device simply isn't long enough to reach the desired outlet causing consumer frustration.

Thus, it would be advantageous if there were a simple and effective means of providing an extension cord on an existing outlet that is retractable so as to not clutter an area with cords.

SUMMARY OF THE INVENTION

In a first aspect the present invention provides a receptacle apparatus for mounting on a wall closely adjacent a standard outlet. The receptacle apparatus comprises a mounting base member formed of a first predetermined material and having a first predetermined shape for mounting onto a wall stud closely adjacent a standard wall outlet. A central brace member is formed on the mounting base member for mounting such mounting brace member onto such wall stud. There is at least one aperture disposed on a side of the central brace member for mounting over such standard wall outlet thereby leaving such standard outlet exposed. A cover member is formed of a second predetermined material and has a second predetermined shape for engagement with the mounting base member. Such cover member includes an internal cord assembly having a male end thereof engageable with a first outlet in such standard wall outlet and having a female outlet on a second end disposed adjacent the outer portion of such cover member for providing electrical power to such female outlet. A retractable extension cord assembly is mounted on an inner portion of the cover member. Such retractable extension cord assembly has a male end engageable with a second outlet on such standard wall outlet and a female end of the retractable extension cord extending through an opening in the cover member for providing access to the retractable extension cord as needed by a user. There is also a means for engaging the cover member with the mounting base member.

In a second aspect of the invention there is provided a method of installing a receptacle apparatus for ensuring that all cords are kept neatly out of sight. The method includes the steps of selecting a standard wall outlet where such receptacle apparatus will be used. Another step is determining which side of such standard wall outlet a wall stud is located and a step of removing the cover from such standard wall outlet. Another step is aligning a center strip of a mounting base member of such receptacle apparatus with such wall stud and securing the mounting base member to such wall stud. Another step is plugging in a plug-in pigtail into a first outlet of such standard wall outlet, such plug-in pigtail having an outlet connected on an outer portion of a cover assembly of the receptacle apparatus. A step of plugging in a male end of a retractable cord member into the second outlet of such standard wall outlet, such retractable cord member disposed on an inner portion of the cover assembly. There is a step of placing the female end of the retractable cord member through an opening in such cover assembly so that such retractable extension cord is available for use and a step of securing the cover member onto the mounting base member.

OBJECTS OF THE INVENTION

It is, therefore, one of the primary objects of the present invention to provide an apparatus that will keep electrical cords out of the way.

Another object of the present invention is to provide an apparatus that will fit over an existing wall outlet that has a built in retractable extension cord.

Still another object of the present invention is to provide an apparatus that has a built in extension cord that is compatible with devices such as curling irons, blow dryers and blenders.

In addition to the various objects and advantages of the invention which have been described in some specific detail above it should be noted that various other objects and advantages of the present invention will become more readily apparent to those persons who are skilled in the relevant art from the following more detailed description, particularly when such description is taken in conjunction with the appended claims.

Figure 1:
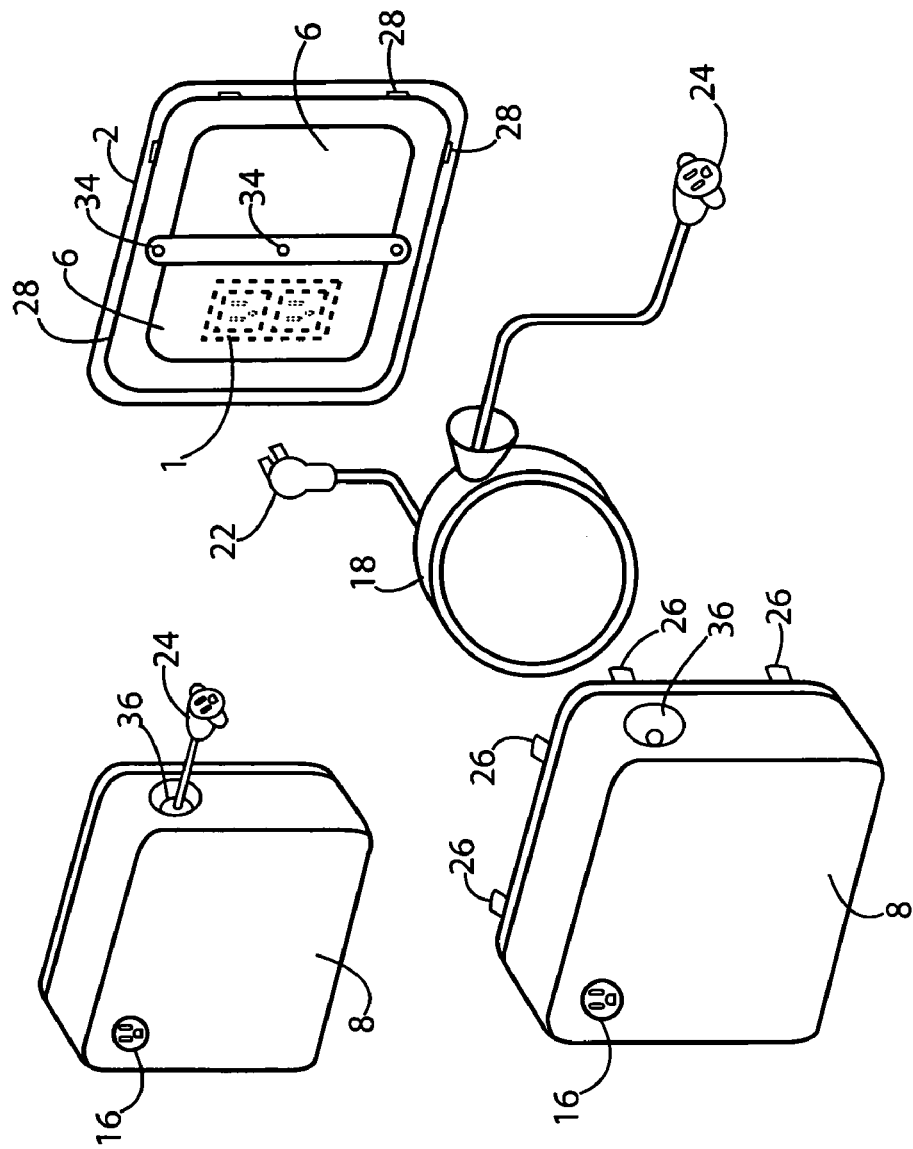
FIG. 1 is a front break down view of the apparatus according to an embodiment of the invention showing the various parts of the apparatus.
Figure 2:
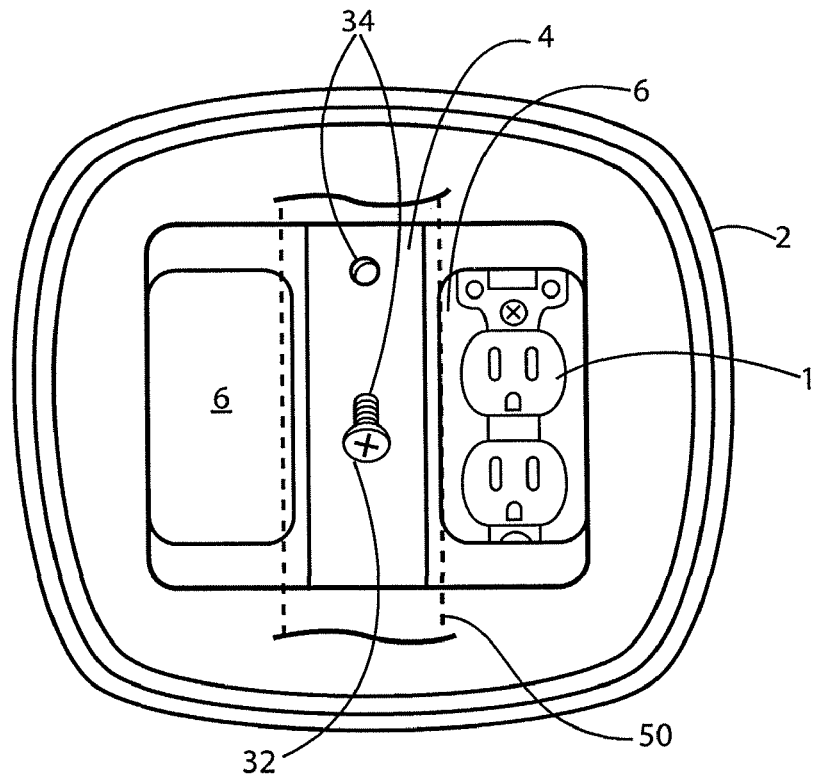
FIG. 2 is a is a front perspective view of the mounting base member showing the standard wall outlet.

BRIEF DESCRIPTION OF THE PRESENTLY PREFERRED AND VARIOUS ALTERNATIVE EMBODIMENTS OF THE INVENTION

Prior to proceeding with the more detailed description of the present invention it should be noted that, for the sake of clarity, identical components which have identical functions have been designated by identical reference numerals throughout the several views illustrated in the drawings.

In a first aspect the present invention provides a receptacle apparatus, generally designated 10, for mounting on a wall closely adjacent a standard outlet 1. The receptacle apparatus 10 comprises a mounting base member 2 formed of a first predetermined material and having a first predetermined shape for mounting onto a wall stud 50 closely adjacent a standard wall outlet 1. A central brace member 4 is formed on the mounting base member 2 for mounting such mounting brace member 2 onto such wall stud 50. There is at least one aperture 6 disposed on a side of the central brace member 4 for mounting over such standard wall outlet 1 thereby leaving such standard outlet 1 exposed. A cover member 8 is formed of a second predetermined material and has a second predetermined shape for engagement with the mounting base member 2. Such cover member 8 includes an internal cord assembly 12 having a male end 14 thereof engageable with a first outlet in such standard wall outlet 1 and having a female outlet 16 on a second end disposed adjacent the outer portion of such cover member 8 for providing electrical power to such female outlet 16. A retractable extension cord assembly 18 is mounted on an inner portion of the cover member 8. Such retractable extension cord assembly 18 has a male end 22 engageable with a second outlet on such standard wall outlet 1 and a female end 24 of the retractable extension cord assembly 18 extending through an opening in the cover member 8 for providing access to the retractable extension cord 18 as needed by a user. There is also a means, generally designated 20, for engaging the cover member 8 with the mounting base member 2.

Such means 20 includes tabs 26 disposed on the cover member for engagement with slots 28 formed on the mounting base member 2 thereby securing the cover member 8 to the mounting base member 2.

Such central brace member 4 is secured to such wall by means of an adhesive and by screws 32. Such central brace member 4 has pre-drilled holes 34 therein for using the mounting screws 32 into the wall stud 50. Although it is discussed as a separate entity it should be noted that such central base member 4 is molded into the mounting base member 2 as a single unit.

Such mounting base member 2 includes two apertures 6, a first aperture 6 disposed on one side of the central brace member 4 and a second aperture 6 formed on another side of the central base member 4 so that such standard wall outlet 1 is readily accessible regardless of where a wall stud 50 is located.

Figure 6:
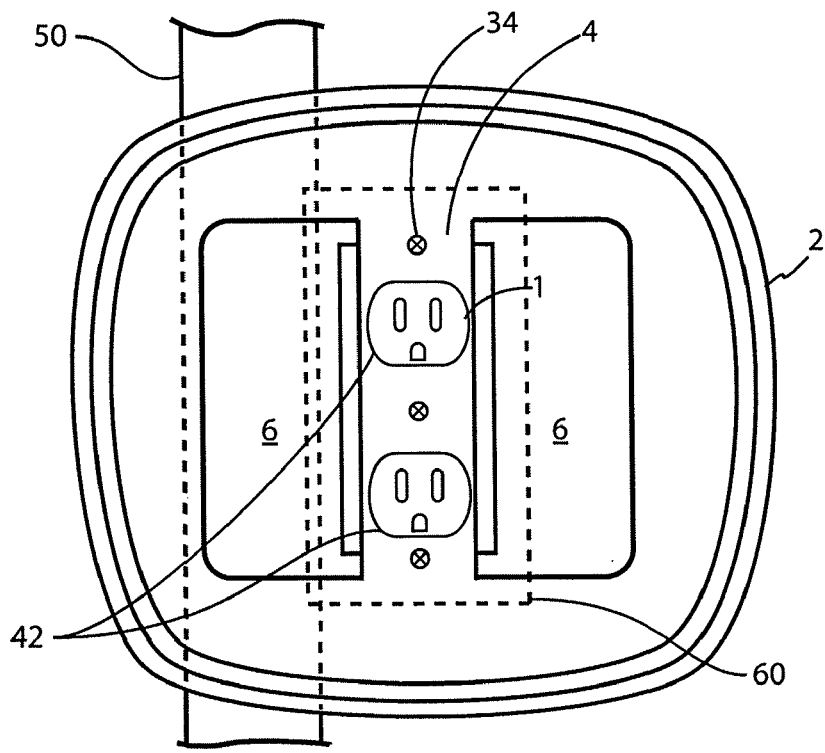
FIG. 6 is a front perspective view of an alternate embodiment of the mounting base member wherein such mounting base member can be installed directly onto a wall outlet in place of the standard cover.

It should be noted that even with only one aperture 6 such mounting member 4 could still be used regardless of the position of the wall stud 50 since the mounting base member is substantially square and the unit could simply be turned around so that the aperture 6 would correspond to the standard wall outlet 1 regardless of which side of the wall outlet 1 the wall stud 50 is located. However, it is preferred that such apparatus 10 have two such apertures 6 as is shown in the drawing Figures. In an alternate embodiment of mounting base member 2 as seen in FIG. 6 such central base member 4 has openings 42 disposed therein for installing such mounting base member 2 directly onto a wall outlet 1 in place of the standard cover 60. The mounting base member 2 could still be permanently mounted by screwing into the wall as described previously.

The predetermined shape of the receptacle apparatus 10 is substantially rectangular and even more preferred that such rectangular shape be substantially a square.

Figure 4:
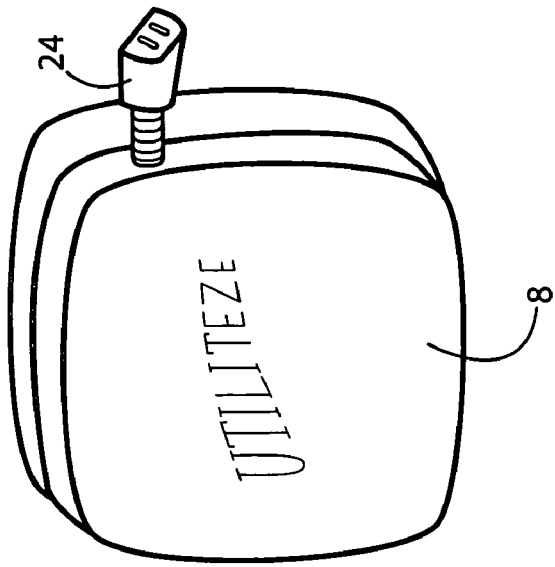
FIG. 4 is a front perspective view of the cover member.
Figure 3:
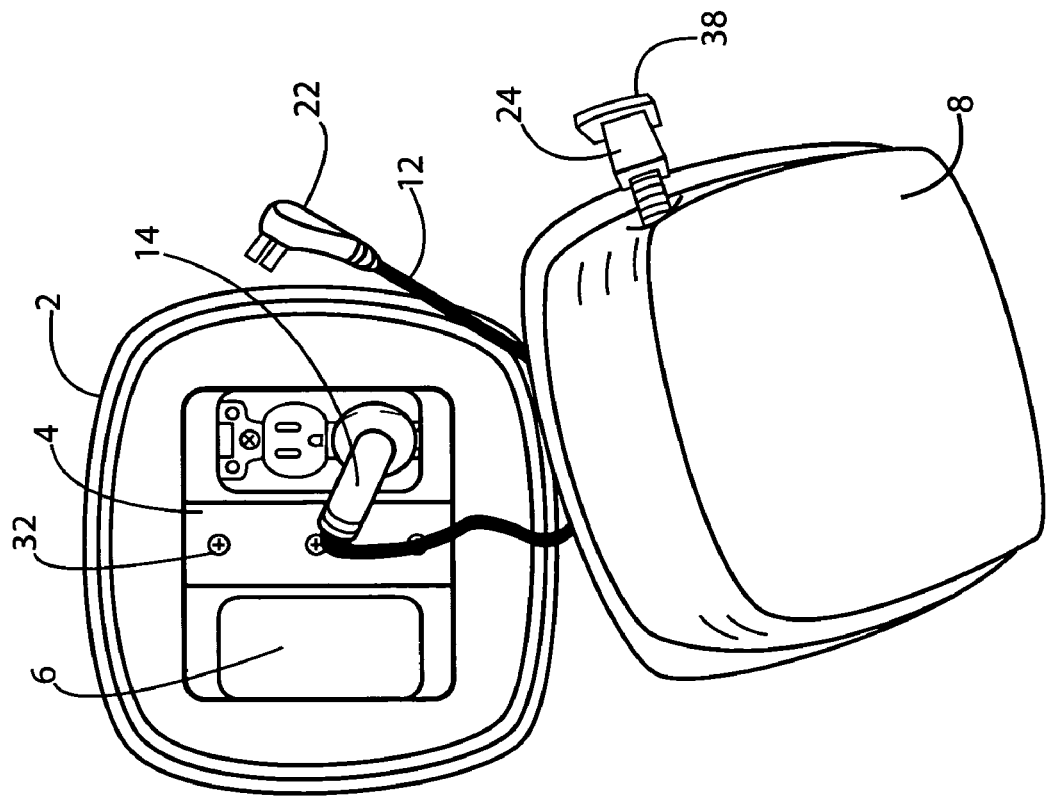
FIG. 3 is a front perspective view of the mounting base member shown in FIG. 2 and the cover member with the internal plugs.
Figure 5:
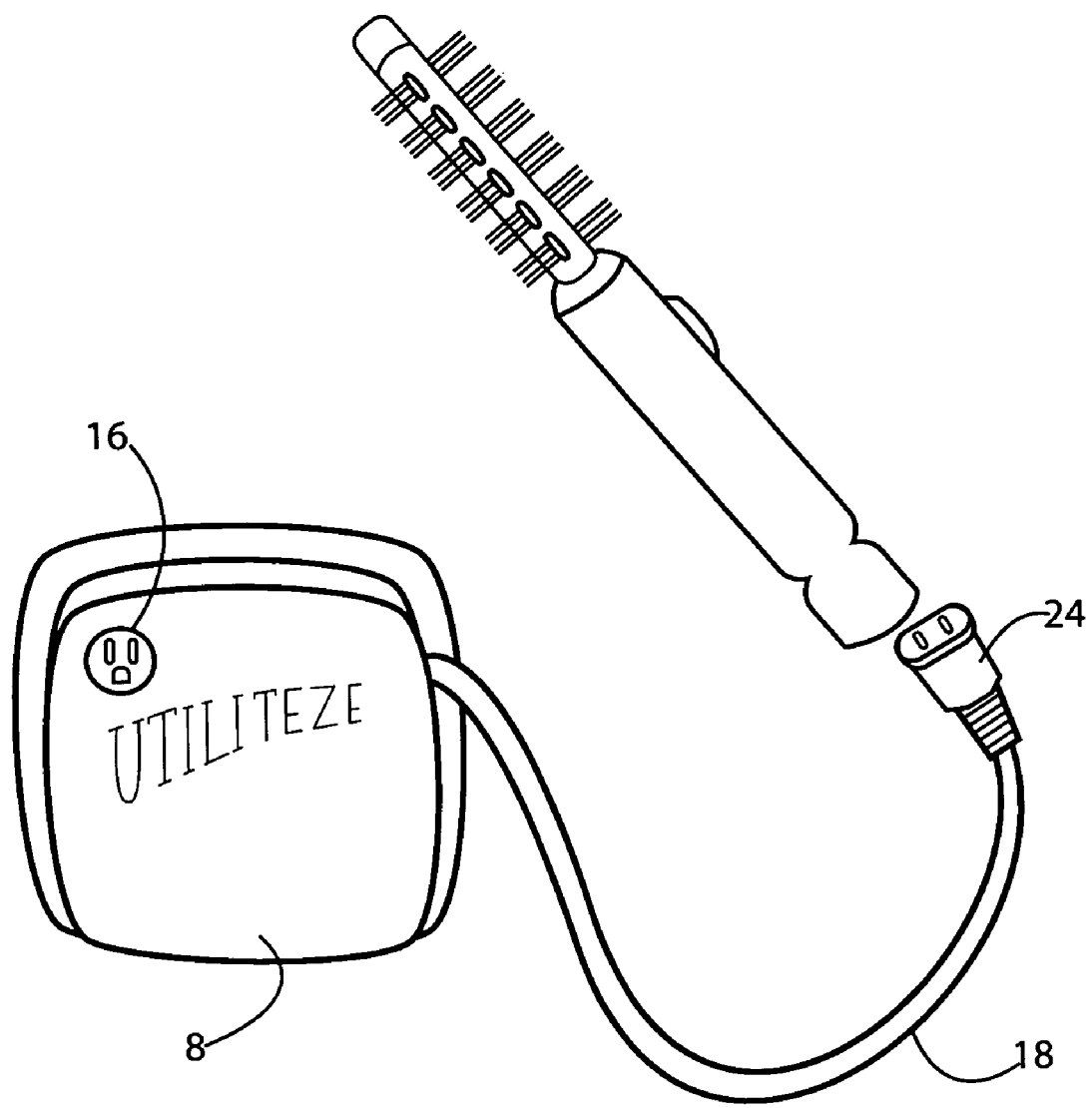
FIG. 5 is front perspective view of the cover member in place showing the retractable extension cord being connected to a an electrical device.

The female outlet 16 of the internal cord assembly 12 that is disposed adjacent the outer portion of the cover member 8 is available for use as a regular wall outlet. This is seen in FIGS. 1 and 4.

In a second aspect of the invention there is provided a method of installing a receptacle apparatus 10 for ensuring that all cords are kept neatly out of sight. The method includes the steps of selecting a standard wall outlet 1 where such receptacle apparatus 10 will be used. Another step is determining which side of such standard wall outlet 1 a wall stud 50 is located and a step of removing the cover 60 from such standard wall outlet 1. Another step is aligning a central brace member 4 of the mounting base member 2 of such receptacle apparatus 10 with such wall stud 50 and securing the mounting base member 2 to such wall stud 50. Another step is plugging in a male end 14 of an internal cord assembly 12 into a first outlet of the standard wall outlet 1 and having a female outlet 16 on a second end thereof disposed adjacent an outer portion of the cover assembly 8 of such receptacle apparatus 10 for providing power to such female outlet 16. There is a step of plugging in a male end 22 of a retractable extension cord member 18 into the second outlet of such standard wall outlet 1, such retractable extension cord member 18 disposed on an inner portion of the cover assembly 8. And a step of placing the female end 24 of the retractable extension cord member 18 through an opening 36 in such cover assembly 8 so that such retractable extension cord 18 is available for use and a step of securing the cover member 18 onto the mounting base member 2.

Such method further includes a step of pulling out the retractable extension cord member 18 for use as a normal extension cord.

The method includes a step of including a twist lock receptacle 38 on said retractable extension cord member 18 which can be coupled directly to compatible electrical devices.

There is an additional step of using the female outlet 16 disposed on such outer portion of such cover assembly 8 as a standard wall outlet. There is also a step of securing the mounting base member 2 to a wall stud 50 by means of screws 32.

While a presently preferred embodiment and alternate embodiments of the present invention have been described in detail above, it should be understood that various other adaptations and/or modifications of the invention can be made by those persons who are particularly skilled in the art without departing from either the spirit of the invention or the scope of the appended claims.

I claim:

1. A receptacle apparatus for mounting on a wall closely adjacent a standard wall outlet, said receptacle apparatus comprising:
   (a) a mounting base member formed of a first predetermined material and having a first predetermined shape for mounting onto a wall stud closely adjacent the standard wall outlet;
   (b) a central brace member formed on said mounting base member for mounting said mounting base member onto the wall stud;
   (c) at least one aperture disposed on a side of said central brace member for mounting over the standard wall outlet thereby leaving the standard wall outlet exposed;
   (d) a cover member formed of a second predetermined material and having a second predetermined shape for engagement with said mounting base member; said cover member including;
      (i) an internal cord assembly having a male end thereof engageable with a first outlet in the standard wall outlet and a female outlet on a second end disposed adjacent an outer portion of said cover member for providing electrical power to said female outlet, and
      (ii) a retractable extension cord assembly mounted one of on an inner portion of said cover member and said mounting base member, said retractable extension cord assembly having a male end engageable with a second outlet on the standard wall outlet and a female end of said retractable extension cord extending through an opening in said cover member for providing access to said retractable extension cord as needed by a user; and
   (e) a means for engaging said cover member with said mounting base member.

2. The receptacle apparatus, according to claim 1, wherein said means includes tabs disposed on one of said cover member and said mounting base member for engagement with slots formed on an opposite one of said cover member and said mounting base member thereby securing said cover member to said mounting base member.

3. The receptacle apparatus, according to claim 1, wherein said central brace member is secured to the wall by means of one of an adhesive and screws.

4. The receptacle apparatus, according to claim 3, wherein said central brace member is secured to a wall stud portion of the wall by the screws.

5. The receptacle apparatus, according to claim 4, wherein said central brace member has pre-drilled holes therein for receiving said screws.

6. The receptacle apparatus, according to claim 1, wherein said central brace member includes two apertures, a first aperture disposed on one side of said central brace member and a second aperture formed on another side of said central brace member so that the standard wall outlet is readily accessible regardless of where the wall stud is located.

7. The receptacle apparatus, according to claim 1, wherein said first predetermined shape is substantially rectangular.

8. The receptacle apparatus, according to claim 7, wherein said rectangular shape is substantially a square.

9. The receptacle apparatus, according to claim 1, wherein said female outlet disposed adjacent said outer portion of said cover member is available for use as the standard wall outlet.

10. The receptacle apparatus, according to claim 1, wherein said female outlet disposed adjacent said outer portion of said cover member is disposed one of on a front portion and a side portion of said cover member.

11. A method of installing a receptacle apparatus for ensuring that all cords are kept neatly out of sight, said method including the steps of:
(a) selecting a standard wall outlet where said receptacle apparatus will be used;
(b) determining which side of said standard wall outlet a wall stud is located;
(c) removing a cover from said standard wall outlet;
(d) aligning a center strip of a mounting base member of said receptacle apparatus with said wall stud;
(e) securing said mounting base member to said wall stud;
(f) plugging in a male end of an internal cord assembly into a first outlet of said standard wall outlet and having a female outlet on a second end disposed adjacent an outer portion of a cover assembly of said receptacle apparatus for providing power to said female outlet;
(g) plugging in a male end of a retractable extension cord member into a second outlet of said standard wall outlet, said retractable extension cord member disposed on an inner portion of said cover assembly;
(h) placing a female end of said retractable cord member through an opening in said cover assembly so that said retractable extension cord is available for use; and
(i) securing said cover assembly onto said mounting base member.

12. The method, according to claim 11, wherein said method further includes a step of pulling out said retractable cord member for use as an extension cord.

13. The method, according to claim 11, wherein said method further includes a step of using a twist lock receptacle on said retractable cord member which can be coupled directly to compatible electrical devices.

14. The method, according to claim 11, wherein said method further includes a step of using said outlet disposed on said outer portion of said cover assembly as said standard wall outlet.

15. The method, according to claim 11, wherein said method further includes a step of securing said mounting base member to a wall stud by means of screws.

16. A receptacle apparatus for mounting on a wall closely adjacent a standard wall outlet, said receptacle apparatus comprising:
(a) a mounting base member formed of a first predetermined material and having a first predetermined shape for mounting onto a wall stud closely adjacent the standard wall outlet;
(b) a central brace member formed on said mounting base member for mounting said mounting base member onto the wall stud;
(c) at least one aperture disposed on a side of said central brace member for mounting over the standard wall outlet thereby leaving the standard wall outlet exposed;
(d) a pair of spaced apart openings formed on said central brace member through a thickness of said brace, each of said pair of spaced apart openings sized and shapes so as to receive a female receptacle of the standard wall outlet therewithin;
(e) three mounting holes formed through a thickness of said brace, wherein one of said mounting holes is disposed between said pair of openings and wherein other two mounting holes are disposed on the other side of a respective opening;
(f) a cover member formed of a second predetermined material and having a second predetermined shape for engagement with said mounting base member; and
(g) a retractable extension cord assembly mounted one of on an inner portion of said cover member and said mounting base member, said retractable extension cord assembly having a male end engageable with a second outlet on the standard wall outlet and a female end of said retractable extension cord extending through an opening in said cover member for providing access to said retractable extension cord as needed by a user; and
(e) a means for engaging said cover member with said mounting base member.

* * * * *